United States Patent [19]

Seiffert

[11] Patent Number: 4,611,629

[45] Date of Patent: Sep. 16, 1986

[54] THERMOSTATICALLY ACTUATED VALVE

[75] Inventor: Günther Seiffert, Olsberg, Fed. Rep. of Germany

[73] Assignee: F.W. Oventrop Arn. Aohn KG, Olsberg, Fed. Rep. of Germany

[21] Appl. No.: 755,484

[22] Filed: Jul. 16, 1985

[30] Foreign Application Priority Data

Nov. 3, 1984 [DE] Fed. Rep. of Germany ....... 3440198

[51] Int. Cl.$^4$ ............................................. F16K 31/18
[52] U.S. Cl. ............................ 137/614.21; 137/454.5; 251/11; 251/322
[58] Field of Search ........... 137/454.5, 614.18, 614.11, 137/614.21, 513.3; 251/284, 322, 11

[56] References Cited

U.S. PATENT DOCUMENTS

| | | | |
|---|---|---|---|
| 1,171,610 | 2/1916 | Hauer | 137/614.21 |
| 1,518,025 | 12/1924 | Vance | 137/454.5 |
| 1,783,327 | 12/1930 | Growley | 251/322 |
| 3,052,258 | 9/1962 | Keller, III | 137/454.5 |
| 3,075,541 | 1/1963 | Hajek | 137/614.21 |
| 4,111,392 | 9/1978 | Edelmann | 251/322 |
| 4,191,210 | 3/1980 | Belart et al. | 137/513.3 |

FOREIGN PATENT DOCUMENTS 2514040 10/1976 Fed. Rep. of Germany .
2926599 1/1981 Fed. Rep. of Germany .
3112138 2/1983 Fed. Rep. of Germany .

OTHER PUBLICATIONS

Maintenance & Modernization Supervisor, vol. 4, No. 9, Sep. 1984, Insert Foils Radiator Thermostat Tampering by Bob McDonald, Vice Pres., American Steam Control Co., 200 Fifth Ave., New York, NY 10010.

Primary Examiner—A. Michael Chambers
Attorney, Agent, or Firm—Karl F. Ross; Herbert Dubno

[57] ABSTRACT

A thermostatic valve in which all of the functioning parts are formed in an insert which is threaded into the valve housing. The insert can include a body for guiding the valve stem and having a sleeve forming a main valve unit and an auxiliary valve unit, the latter being engageable by a limiting body to restrict flow through the valve in the fully open position of the main valve member with respect to the main valve seat.

8 Claims, 4 Drawing Figures

THERMOSTATICALLY ACTUATED VALVE

FIELD OF THE INVENTION

My present invention relates to a thermostatically actuated valve and, more particularly, to a thermostatic valve in which, within a valve housing, a valve seat is formed and a valve member is constituted on a spindle and is adapted to engage or approach the valve seat, at least in part in response to a thermostatic control or head which can be mounted upon the valve housing.

BACKGROUND OF THE INVENTION

A thermostatically controlled valve is described, for example, in German patent document No. 31 12 138 and comprises a valve body in which a thermostatically displaceable valve spindle is recited, this spindle carrying the valve member and having an extension passing through the valve seat and provided on the opposite side thereof from the main valve member with a limiting body which is greater in diameter than the neck connecting the body with the valve member and which, in the closed position of the valve, is spaced away from the valve seat and the passage therethrough.

In this system, the limiting body is so constructed that its cross section is smaller than that of the valve seat bore so that, when the body is shifted toward the bore, sufficient flow is provided.

This configuration is used so that with an increasing valve stroke, the throughput is not limited to a constant value, but rather is reduced from an upper limit. This serves, with large differences between the setpoint and actual values of the temperature of the valve, to ensure that the valve is only partly open and consequently, when the heating unit with which the valve is provided turns on initially or after a reduction in output for nighttime use, all heating units can be supplied with the heating medium from the pump.

In other words, this prevents a sudden wide opening of one or more of the thermostatically controlled valves under these circumstances so that associated heating units receive all of the circulating heating medium to the exclusion of other heating units.

Another way of solving the problem has been proposed in the German patent document DE-OS No. 29 26 599 in which two heat sensors are provided, one of which operates with cold contact to ensure that the valve will completely or substantially completely close.

Another thermostatic control valve is described in German patent document DE-OS No. 25 14 040 in the form of a safety valve in which for cold contact and failure of the thermostat the valve passage is closed by the valve member but a limiting body of the type described can pass through the valve seat bore.

The publication *Maintenance and Modernization Supervisor* of September 1984 (vol. 4, No. 9) describes a thermostatically actuated valve in which the limiting body has a cross section greater than that of the valve seat bore so that in the maximum-opening position of the valve with respect to the main valve body, the limiting body can come to lie against the auxiliary seat formed at the opposite end of the valve seat bore or passage. With such a valve, upon removal of the thermostat head or a failure thereof, the valve spindle is removed into a position in which the limiting body blocks the body passage to prevent overheating of the room and serious energy losses.

In other words, even with failure of the thermostat head or its removal, throughtput through the valve is severely restricted or blocked.

In the German patent document No. 31 12 138, deposits can form in the valve-seat bores so that the limiting body cannot fully block the passage or insufficiently blocks the latter. This can prevent full closure of the valve.

A disadvantage of the latter system, however, is that a very precise adjustment and positioning of the limiting body relative to the valve seat body is required for effective operation and this precise adjustment is expensive to achieve because the limiting body is received with play in the passage so that exact orientation cannot be ensured by an arrangement on the housing.

In the system of German patent document DE-OS No. 29 26 599 another disadvantage can be ascertained. Here at least two heat sensors must be provided which, of course, involves expensive elements.

The valve of the *Maintenance and Modernization Supervisor* article mentioned previously also is expensive to fabricate and maintain and is difficult to mount and assemble. The limiting body must be inserted through the pipe or tube fittings into the valve housing and there attached to the valve stem which has previously been provided in the valve body.

OBJECTS OF THE INVENTION

It is, therefore, the principal object of the present invention to provide an improved thermostatically controlled valve whereby the disadvantages of these earlier arrangements can be obviated.

Another object of the invention is to provide a simpler thermostatically controlled valve which nevertheless allows flow limitation upon removal of the thermostatic head or failure thereof.

Yet another object of the invention is to provide a thermostatically controlled valve of simple and economical construction and ease of manufacture and assembly, which nevertheless is effective both during normal operation of the thermostat head and upon removal and/or failure of the latter.

SUMMARY OF THE INVENTION

These objects and others, which will become apparent hereinafter, are attained, in accordance with the invention, in a thermostatically controlled valve which comprises a valve body or housing and a valve insert which is threadedly engaged in this body and sealed with respect to the latter and in which the insert comprises the valve member as well as the valve seat, the valve member having a stem which is controlled by a thermostatic head and carries the main valve member, the main valve member being engageable with the main valve seat surrounding a valve passage or window in this insert and having a neck traversing the valve passage with clearance and formed on the opposite side from said main valve member with a limiting body of a larger diameter or cross section than the passage and adapted to bear against an auxiliary seat formed in the insert on the opposite end of the valve passage.

Consequently, the double-seat portion of the structure is formed on the insert which carries the valve stem and the limiting body and main valve body and which may be interchangeably or replaceably mounted in the valve housing which is provided with a fitting communicating with opposite sides of the valve passage.

The exact adjustment of the valve stroke between the limiting body and the main valve member can be easily set on the insert before it is introduced into the valve housing and the sealing surfaces can likewise be fabricated in an extremely simple manner.

The mounting and dismounting of the insert can be effected simply by screwing the insert into a threaded portion of the valve housing and it is possible, in accordance with the invention, to accommodate the insert to existing valve housing structures so that conventional valves can be reequipped with the insert in accordance with the invention at low cost and with a minimum of effort.

Advantageously, the valve-seat portion of the insert is provided as a sleeve where the flange edge effective in one direction, i.e. in the direction of introduction of the insert into the valve housing, engages a shoulder or abutment of the valve housing.

A sealing ring can be introduced between the sleeve and the surrounding portion of the valve housing and this ring can abut the flange. The ring preferably is an O-ring which is received in a construction or recess of the sleeve.

Naturally, the sleeve portion of the insert beyond the flange and the limiting body which may project beyond the sleeve portion, should have diameters or cross sections less than those of the housing surrounding the sleeve portion. This ensures an accurate but nevertheless simple mounting of the valve insert.

The adjustment of the valve stroke can be simplified by making the limiting body axially shiftable on the valve stem or spindle.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 4:
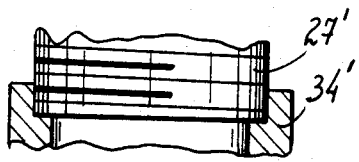
FIG. 4 is a detail section illustrating another embodiment of the invention.
Figure 1:
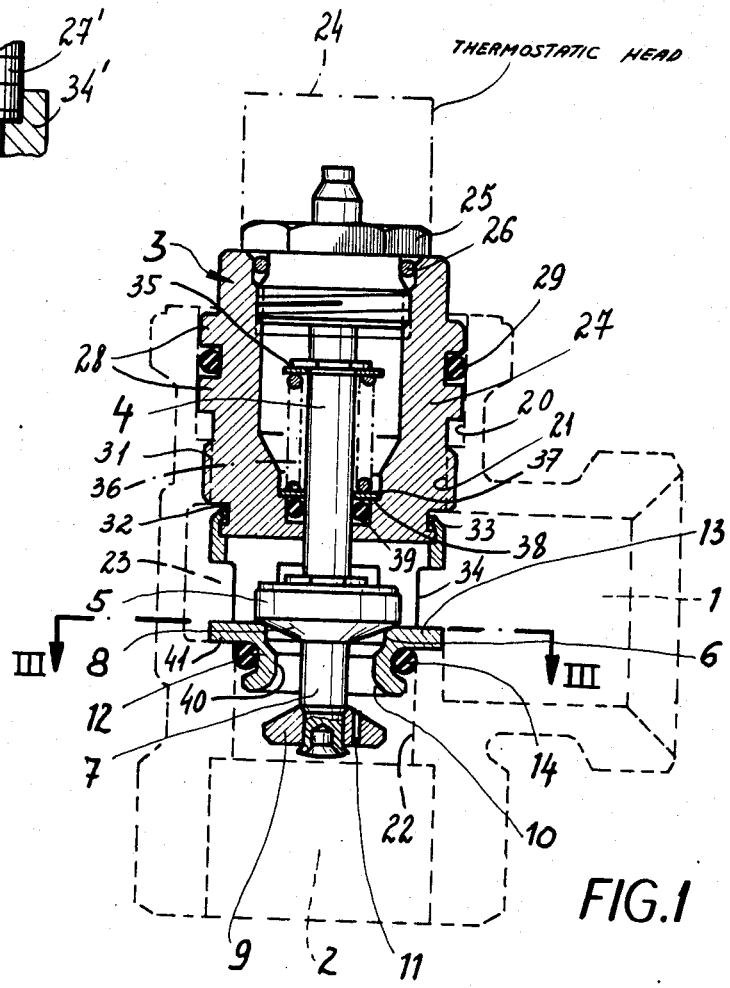
FIG. 1 is an axial cross section through an insert for a thermostatic valve in accordance with the invention, the thermostatic heading being shown in dot-dash line while the valve housing has been shown in broken line.

A housing for the valve of the invention can have an inlet fitting provided with a female thread and shown diagrammatically at 2, an outlet fitting provided with a male thread and shown diagrammatically at 1, a bore 20 which is internally threaded at 21 and has a somewhat reduced diameter at 22 to accommodate a valve insert represented in solid lines at 3. The bore 20, 22 communicates with a member 23 connecting the inlet 2 with the outlet 1.

The insert 3 can be provided with a thermostatic head 24 shown in dot-dash lines and coupled with a valve stem 4 which passes axially through a packing plug 25 sealed by an O-ring 26 with respect to the upper member 27 of the insert.

Member 27 has a pair of shoulders 28 between which an O-ring 29 is provided, the O-ring sealing against the wall of the bore 20.

A threaded portion 31 of the upper portion 27 is threadedly engaged in the threaded portion 21 of the bore 20.

Below this threaded portion 31, the upper member 27 is formed with an outwardly open annular groove 32 in which an edge 33 of a sleeve 34 is clenched to secure this sleeve to the upper portion 27.

Alternatively, as can be seen from FIG. 4, the upper portion 27' may be threaded below the screw thread 31 and can be locked to the sleeve 34' by a screw thread connection.

The valve spindle 4 is axially shiftable in the insert 3 and forms part of it, carrying a seat 35 for one end of a coil spring 36 which is braced against a washer 37 seated against a shoulder 38 within the insert which also receives an O-ring 39 sealing around the valve spindle 4.

The coil spring 36 acts counter to the force supplied by the thermostatic head and is prestressed to bias the stem upwardly when the thermostatic head is inoperative or has been removed.

The valve stem 4 carries the main valve member 5 which cooperates with a valve 6 as a frustoconical transition portion 8 of a downwardly converging cross section.

The transition portion of the valve member 5 is connected to a neck 7 whose cross section with respect to the cross section of the throughgoing valve passage or bore 40 is comparatively small.

At the free end of the neck 7 a limiting body or auxiliary valve member 9 is mounted. This valve member has a cross section or diameter greater than that of the neck 7 and in the normal closed position of the valve, shown in the drawing, is spaced from the opposite end of the valve bore from the seat 6.

In the embodiment shown the limiting body 9 is fixed in place on the neck 7 by swaging.

Figure 2:
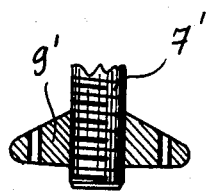
FIG. 2 is an axial section through the limiting body according to another embodiment of the invention.
Figure 3:
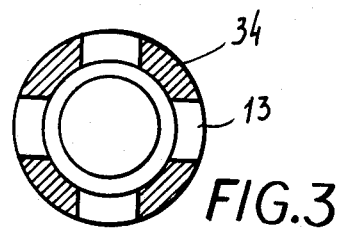
FIG. 3 is a section along the line III—III of FIG. 1 through the insert of the invention.

Alternatively, as can be seen from FIG. 2, the neck 7' can be threaded and the limiting body 9' attached thereto by a screw thread so as to be axially adjustable along this neck.

The limiting body 9 or 9', which has a greater cross section than that of the valve seat bore 40 in the maximally open position corresponding to a failure of the thermostat head or its removal, is forced by the spring 36 against an auxiliary valve seat 10.

Consequently, upon failure of the thermostat head or its removal, the limiting body 9 can seal against a corresponding valve seat 10 so that overheating and energy losses can be avoided.

To ensure a continuous flow through the valve in the event of such failure, thereby preventing freeze-up, a small passage 11 can be formed in the limiting body 9 or 9' parallel to the direction of displacement to communicate between the inlet 2 and the annular clearance between the neck 7 and the wall of the bore 40.

In the illustrated embodiment, the passage 11 is a bore.

The valve insert 3 which is screwed into the housing contains all of the aforementioned elements of the valve.

Valve units are formed in the sleeve 34 on opposite sides of a restriction 12 forming the passage 40 and also defining an outwardly open annular channel in which an O-ring 14 is received to seal against the wall of the passage 22.

The portion 12 is also provided with a flange member 13 which act in a unidirectional sense to engage a shoulder 41 of the housing around the passage 22. At the mouth thereof, the clenching of the sleeve to the upper part of the insert can be facilitated if radial slits are provided in the sleeve to allow deflection of the edge 33.

Portions of the insert which are to be fitted into the housing are, of course, smaller in cross section or diameter than the passage 20, 22 receiving same and the adjustment of the valve stroke can be effected by varying the axial space between the main valve member 5 and the limiting body 9, this being adjustable if desired by the screw thread arrangement shown in FIG. 2.

The resulting valve insert or set can, therefore, be used in conventional valve housings without exceptional expense.

Residual flow through the passage 11 should be in the range of 10% of the maximum flow although greater or lesser flow can be used if desired. If greater flow is required, the diameter of the passage 11 can be increased or the number of such passages can be increased.

I claim:

1. A thermostatic valve comprising:
   a valve housing formed with a bore, an inlet fitting communicating with said bore and outlet fitting communicating with said bore; and
   a valve insert threadedly received in said bore, said insert being a unit receivable in said housing and removable as a unit therefrom and comprising:
   an insert body sealed with respect to said bore,
   a valve stem extending axially through said body and provided with a main valve member engageable with a main valve seat in said body communicating between said fittings via a valve passage surrounded by said main valve unit,
   a neck passing through said passage with clearance,
   a limiting body on said neck engageable with an auxiliary valve seat formed at an opposite end of said passage from said main valve seat, said limiting body being of a greater cross section than said passage, and
   a spring in said body bearing upon said stem and urging said limiting body into engagement with said auxiliary seat in a maximum open position of said main valve member with respect to said main valve seat, said seats and said passage being formed in a sleeve affixed to an upper portion of said insert body, said sleeve being provided with a flange unidirectionally engaging an abutment formed in said housing immediately adjacent a portion of said bore upon threaded insertion of said insert in said housing, a sealing ring being provided between said sleeve and said portion of said bore immediately adjacent said flange.

2. The thermostatic valve defined in claim 1 wherein said sleeve is provided with a constriction defining an outwardly open groove receiving the sealing ring.

3. The thermostatic valve defined in claim 2, further comprising means for mounting said limiting body so as to be axially shiftable to said neck.

4. The thermostatic valve defined in claim 3 wherein said portion of said insert body is formed with a groove receiving an O-ring sealing in said bore against said housing.

5. The thermostatic valve defined in claim 4, further comprising at least one passage formed in said limiting body for bleeding liquid between said inlet and outlet fittings when said limited body engages said auxiliary seat.

6. The thermostatic valve defined in claim 5 wherein said sleeve is threaded onto said portion of said insert body.

7. The thermostatic valve defined in claim 5 wherein said sleeve is clenched onto said portion of said insert body.

8. The thermostatic valve comprising:
   a valve housing formed with a bore, an inlet fitting communicating with said bore and outlet fitting communicating with said bore; and
   a valve insert threadedly received in said bore, said insert being a unit receivable in said housing and removable as a unit therefrom and comprising:
   an insert body sealed with respect to said bore,
   a valve stem extending axially through said body and provided with a main valve member engageable with a main valve seat in said body communicating between said fittings via a valve passage surrounded by said main valve unit,
   a neck passing through said passage with clearance,
   a limiting body on said neck engageable with an auxiliary valve seat formed at an opposite end of said passage from said main valve seat, said limiting body being of a greater cross section than said passage, whereby said limiting body can prevent overheating and energy losses upon failure of a thermostat,
   a spring in said body bearing upon said stem and urging said limiting body into engagement with said auxiliary seat in a maximum open position of said main valve member with respect to said main valve seat,
   means for mounting said limiting body so as to be threadedly received in said neck so as to be axially shiftable to said neck, and
   at least one passage formed in said limiting body for bleeding liquid between said inlet and outlet fittings when said limiting body engages said auxiliary seat, whereby said passage can prevent freezing upon failure of said thermostat,
   wherein said seats and said passage formed in a sleeve affixed to an upper portion of said insert body, said sleeve being provided with a flange unidirectional engaging an abutment formed in said housing upon threaded insertion of said insert in said housing, said sleeve being provided with a constriction defining an outwardly open groove receiving a sealing ring, said sleeve being threaded onto said portion of said insert body, said sleeve being clenched onto said portion of said insert body, said sealing ring being provided between said sleeve and bore, and said portion of said insert body being formed with a groove receiving an O-ring sealing said bore against said housing.

* * * * *